United States Patent [19]
Yamrom et al.

[11] Patent Number: 5,412,765
[45] Date of Patent: May 2, 1995

[54] METHOD FOR VECTOR FIELD VISUALIZATION USING TIME VARYING TEXTURE MAPS

[75] Inventors: Boris Yamrom, Schenectady; Kenneth M. Martin, Clifton Park, both of N.Y.

[73] Assignee: General Electric Company, Schenectady, N.Y.

[21] Appl. No.: 286,588

[22] Filed: Aug. 5, 1994

Related U.S. Application Data

[63] Continuation of Ser. No. 992,309, Dec. 21, 1992, abandoned.

[51] Int. Cl.⁶ .............................................. G06F 15/62
[52] U.S. Cl. .................................................... 395/130
[58] Field of Search ..................... 395/125, 129, 130

[56] References Cited

U.S. PATENT DOCUMENTS

| | | | |
|---|---|---|---|
| 4,769,637 | 9/1988 | Forrester et al. | 340/726 |
| 4,849,746 | 7/1989 | Dubner | 340/726 |
| 4,893,903 | 1/1990 | Thakar et al. | 350/331 |
| 4,922,238 | 5/1990 | Aoki et al. | 340/726 |
| 5,261,041 | 11/1993 | Susman | 395/152 |

*Primary Examiner*—Mark R. Powell
*Assistant Examiner*—Huynh Ba
*Attorney, Agent, or Firm*—David C. Goldman; Paul R. Webb, II

[57] ABSTRACT

A method for visualizing vector fields uses texture mapping for the vectors to create an animated vector field. Vectors are textured with one dimensional texture maps composed of alternating visible and invisible segments. Successively applied texture maps differ from each other in order to create a moving line effect on the vectors being visualized. A fading effect is further provided by varying the intensity of the visible segments.

5 Claims, 1 Drawing Sheet

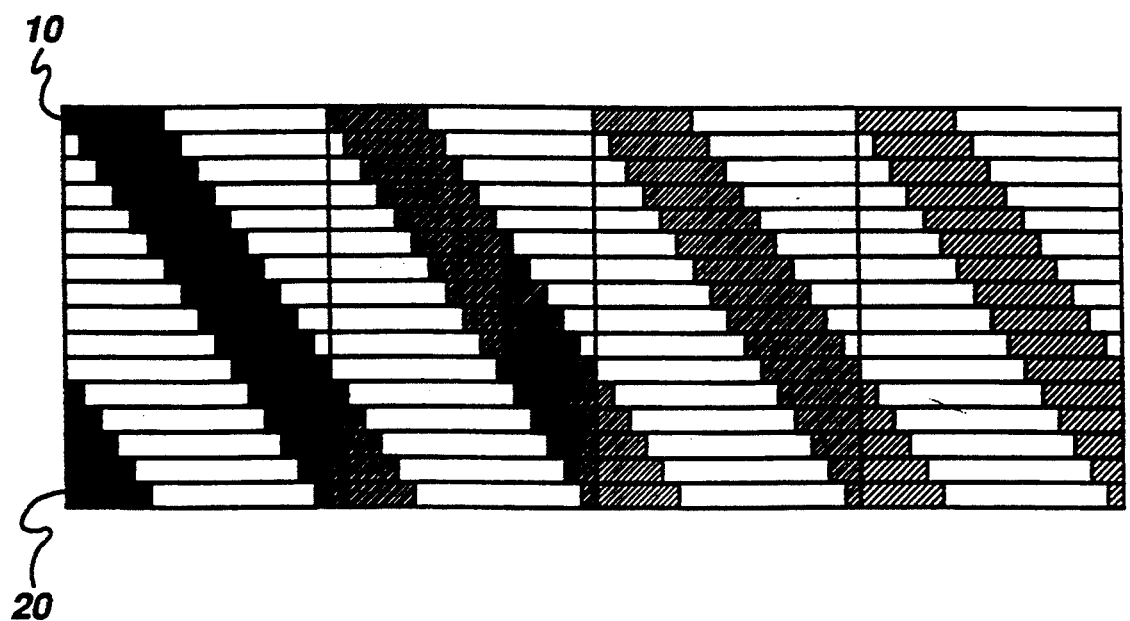

METHOD FOR VECTOR FIELD VISUALIZATION USING TIME VARYING TEXTURE MAPS

This application is a Continuation of application Ser. No. 07/992,309, filed Dec. 21, 1992, abandoned.

BACKGROUND OF THE INVENTION

Vector fields implicitly contain a large amount of data not directly nor easily observable. In engineering applications, vector fields can represent magnetic, electrical, fluid and gas velocity fields as well as various displacement and strain fields. Several techniques exist in computer graphics to assist scientists and engineers in understanding the phenomena behind the analyzed data. One technique called streamlines creates trajectories of massless particles that move along the field. The trajectories are generated using standard techniques by solving differential equations that have right side derivatives equal to the sample vectors of the vector field under investigation.

Another technique called hedgehogs represents the vector field by drawing oriented scaled lines along the vectors of a vector field. Most techniques, except hedgehogs, require the solution of differential equations to generate the appropriate imagery. The solution of differential equations can be time consuming, especially if the original field data is given on a non-structured grid. In the case of the hedgehog technique, the graphics representation is simple and fast. However, if the field data is sampled at more than a few hundred points in the 3-D space, its visual representation on a 2-D computer display can be difficult to understand. If particles are used to simulate the motion along the streamlines, the efficiency of the technique is drastically reduced as the number of particles increases. Another drawback of techniques relying on streamlines is the computational errors that increase with the length of the trajectories. This can produce misleading and inaccurate representations.

In computer graphics, color, texture, and transparency are usually used to enhance visual perception of displayed images. For example, vectors in the hedgehog method can be colored differently based on the vector length. Transparency and texture are more often used to display surfaces and solids. Transparency allows one to view simultaneously two or more objects, one in front of the others. Texture is typically used to present naturally looking surfaces when they simulate real life objects such as wood, grass, buildings, etc., and also to enhance motion perception when one object is moving in front of another. In the last case, texture provides an additional frame of reference for local motion detection.

In the past, one application of color in computer graphics has been to indicate movement and velocity. This has been done through the use of color map cycling. The technique relies on the ability to quickly update a hardware color map to produce the effect of movement in a still raster image. Current graphics supercomputers typically do not rely on color maps to generate screen images, but they do have the ability to perform texture mapping. This ability can be utilized in a similar manner to color map animation, with additional benefits.

SUMMARY OF THE INVENTION

According to the present invention a method for visualizing 2-D or 3-D vector data is provided. One dimensional texture maps comprise multiple segments of visible and invisible elements. Each texture map varies from the others in such a way that upon applying a time sequence of the texture maps to the vector field and displaying the textured vectors, a visual effect of small line segments moving along the individual vectors is achieved. The method utilizes existing texturing capabilities on most graphic processors. Visible elements have a positive intensity and non-zero transparency for black backgrounds and a positive transparency and non-zero intensity for non-black backgrounds. Invisible elements have zero transparency. A fading effect is achieved by varying the intensity of visible elements for black backgrounds and varying transparency for non-black backgrounds. Each texture map is applied proportionally to the size of the individual vector.

BRIEF DESCRIPTION OF THE DRAWINGS

While the novel features of the invention are set forth with particularity in the appended claims, the invention, both as to organization and content, will be better understood and appreciated, along with other objects and features thereof, from the following detailed description taken in conjunction with the drawing, in which:

The sole FIGURE is a graphical representation of the texture maps used in the present invention.

DETAILED DESCRIPTION OF THE INVENTION

A computer implemented method is provided for displaying a representation of a 2-D or 3-D vector field on a graphics processor. The graphics processor must be one with texture mapping capabilities. The method is not limited to any particular graphics processor or texture mapping facility but is equally applicable to any graphics processor or texture mapping facility. The graphics processor should include a memory for storing vector data representing a vector field.

The present invention is a method which utilizes existing texture mapping capabilities on many graphics processors in a novel way in order to better visualize vector fields. The result of this novel use of texturing allows one to get a better visual "feel" for such phenomena as blood flow within vessels or air flow around an object. The visual effect is one of small line segments emanating away from the source of the vector, and in one embodiment to be described, small line segments both moving away from the source and fading in intensity.

The sole FIGURE is a graphical representation which shows the texture maps which are used to practice the invention. The FIGURE is meant only to illustrate the principle of the invention as texture maps are not actually stored in a computer in the format shown, however, the FIGURE along with the description to follow would enable one skilled in the art to practice the present invention.

Referring now to the FIGURE, 16 1-D texture maps are shown. These texture maps are created in accordance with the present invention. Texture map 10 is the first and texture map 20 is the last. The texture maps run horizontally and are stacked vertically. Each texture map consists of 64 texture elements having a specific alpha and intensity value, ttii, where tt and ii are hexadecimal values ranging from 0 to 255. Each texture element in the FIGURE corresponds to a length of 1/64 of the total texture map. In the hexadecimal number system, each t and i is one of {0, 1, 2, 3, 4, 5, 6, 7, 8, 9, a, b, c, d, e, f}. The alpha value (tt) is used by a graphics processor to specify the transparency of a rendered object and the intensity value (ii) is used to attenuate an object's color. The 64 texture elements elements of texture map 10 in the FIGURE can be written in the following form:

ffff(6), 00ff(10), ffcf(6), 00ff(10), ff8f(6), 00ff(10), ff4f(6), 00ff(10)

Pattern ttii (n) corresponds to n consecutive texture elements having an alpha value of tt and an intensity value of ii. Thus, for example, in texture map 10, the first pattern, ffff, corresponds to a visible element with full intensity; 00ff corresponds to an invisible element (intensity therefore does not matter); ffcf corresponds to a visible element of intensity equal to 207 (cf in hex). The intensity value is a decreasing number but the actual values used herein are for illustration only and any decreasing set of numbers on the relevant scale can be chosen for intensity as long as they are decreasing in magnitude.

It can be seen from the FIGURE that each texture map after the first texture map 10 is created by right-shifting the preceding texture map by a fixed number (one in the FIGURE) of texture elements. Texture elements in the right-most positions of the texture maps wrap around to the left-most positions as they are shifted off of the texture map. As explained above, the preferred embodiment of the present invention uses visible segments that are decreasing in intensity. It can be seen from the FIGURE that the texture maps are divided into sections of a length equal to a visible segment and an invisible segment within which section, all visible segments for the ordered sequence of texture maps have equal intensity values.

Once the texture maps are created as shown in the FIGURE and as just described, they are then sequentially applied (e.g., one at a time) to the vectors and after each application, the vectors are displayed on the graphics computer. This step of applying and displaying is repeated any number of times to create the desired visual effect.

Given a two or three dimensional vector field to be displayed, the above-described texture maps are applied to the individual vectors according to the following algorithm:

```
int i;
while (true) {
    i = i % 16;/*take i modulo 16*/
    {assign texture number i to the vector
    field}
    {display the vector field}
    i=i+1
}
```

This code is written in the C programming language and includes two pseudo code descriptions for assigning textures and displaying the vector field. Assigning a texture to a vector in the present invention where only intensity is varied, comprises varying the intensity of the displayed vector (a line segment) along its length proportionally according to the texture map being assigned. The effect of applying the above algorithm is a set of small line segments emanating from the vector field points and moving along the vectors in the vector field and fading away. It is the time-varying nature of the texture mapping which creates this effect. The size of the texture maps, the number of segments in the texture maps, the ratio of the visible to invisible segments in the texture maps (6 to 10 in the example shown in the FIGURE) and the number of texture maps can all be varied. The essential aspects of the present invention are the change of the texture maps (e.g. the right shifting of the pattern seen in the FIGURE) and the presence in them of transparent, or invisible segments which produce the smooth motion effect. Texture maps with constant visible segment intensities could be used, but will not result in the fading effect which is desirable. For non-black backgrounds, the present method would vary transparency tt instead of intensity ii.

To apply texture maps to the rendered vectors, the vectors must be assigned texture coordinates. The present inventive method treats texture maps as having a 2-D range of (0,0) to (1,0). A texture coordinate of (0,0) is assigned to the origin of all the vectors. That is the point in space from which the vector data was calculated or obtained. The end point of the vector is assigned a texture coordinate of (1,0). Its location is determined by the origin of the vector plus the vector quantity multiplied by a user defined constant for all vectors. Thus the magnitude of the displayed vector is linearly proportional to the magnitude of the vector data. By applying the same texture map to all displayed vectors regardless of magnitude one can indicate the magnitude or velocity of the vector data through the apparent velocity of the animated texture maps.

For example, after iterating through the above pseudo code loop sixteen times we will have drawn the display vectors sixteen times with different texture maps. Using the sample texture maps in the accompanying diagram, the effect on one display vector will be to have four dashes move along the display vector away from its origin while slowly fading out. It does not matter how long the display vectors are, within sixteen iterations the four dashes will move one fourth of the distance along the display vector. So for longer display vectors the dashes will move faster. The velocity of these dashes is determined by the magnitude of the display vector which in turn is linearly proportional to the original magnitude of the vector data.

The advantages of the present inventive method over conventional 3-D vector field visualization techniques are several. The continuous motion of the vector field allows one to view a 3-D vector field much more clearly than a static picture does, especially when the number of vectors exceeds several hundred. The method of the present invention is extremely efficient in that no solutions of differential equations are required for computing particle trajectories and since the geometry of the vector field is not changing, the display of thousands of vectors can be done in real time. Since this technique simulates stream particles without actually using them, the accumulated errors associated with iteratively calculating particle trajectories are not encountered. Also as mentioned above, the texture maps can be modified so as to produce different effects. The present invention can also be applied to vector fields by introducing several vector fields, one for each individual time step, and masking all non-current vector fields with transparent textures.

Another variation of the present method is application of randomization to the texture coordinate assignments. Instead of assigning texture coordinates (0,0) and (1,0) to start and end points of all vectors in the vector field one may select for each vector a small random number "r" in the range $0<r<0.2$ and assign texture (r,0) to start point and (r+0.8,0) to the end point of the vector. This procedure will decrease the pulsing nature of the motion.

While specific embodiments of the invention have been illustrated and described herein, it is realized that modifications and changes will occur to those skilled in the art. It is therefore to be understood that the appended claims are intended to cover all such modifications and changes as fall within the true spirit and scope of the invention.

What is claimed is:

1. A computer implemented method for displaying a representation of at least one of a 2-D and a 3-D vector field on a graphics processor including a display screen, means for storing and applying texture information for objects to be rendered, and means for storing sample vector data representing vectors in said at least one 2-D and 3-D vector field, said method comprising the steps of:
    (a) creating an ordered plurality of one-dimensional texture maps stacked vertically, each texture map comprised of a plurality of segments of visible texture elements followed by segments of invisible texture elements, wherein each of said plurality of texture maps following a position of the first of said plurality of texture maps is created by right-shifting the preceding texture map by a fixed number of texture elements wherein texture elements in the right-most positions of said texture maps wrap around to the left-most positions of said texture maps wherein for each texture map, visible elements within each of said plurality of segments after the first of said segments have a lesser intensity than the visible elements in the preceding segment and wherein each texture map comprises sections with a length equal to a visible segment and an invisible segment, within which sections, visible texture elements have a constant intensity, and whereby application of said texture maps creates a visual effect of fading line segments along said vector field;
    (b) sequentially applying said ordered plurality of texture maps from the vertical stack to said sample vector data;
    (c) displaying said vector data after each texture map is applied; and
    (d) repeating steps (b) and (c) a fixed number of times, whereupon application of said texture maps creates a visual effect of moving line segments along said vector field.

2. The method of claim 1 wherein visible elements within each of said plurality of segments after the first of said segments has a lesser transparency than the visible elements in the preceding segment.

3. The method of claim 1 wherein texture coordinates of each vector in the vector field represent an interval of size D, wherein $0<D<1$, shifted randomly by a displacement distributed uniformly in the interval.

4. The method of claim 2 wherein texture coordinates of each vector in the vector field represent an interval of size D, wherein $0<D<1$, shifted randomly by a displacement distributed uniformly in the interval.

5. The method of claim 3 wherein texture coordinates of each vector in the vector field represent an interval of size D, wherein $0<D<1$, shifted randomly by a displacement distributed uniformly in the interval.

* * * * *